Oct. 6, 1959     D. J. N. LIGHT ET AL     2,907,463
SEPTIC AND ANTISEPTIC SEWAGE DISPOSAL UNIT

Filed Feb. 7, 1957     3 Sheets-Sheet 1

INVENTORS
DOUGLAS JOHN NELSON LIGHT
BERTRAND JOAQUIN BLAIR
By
ATTORNEY.

Oct. 6, 1959 D. J. N. LIGHT ET AL 2,907,463
SEPTIC AND ANTISEPTIC SEWAGE DISPOSAL UNIT
Filed Feb. 7, 1957 3 Sheets-Sheet 2
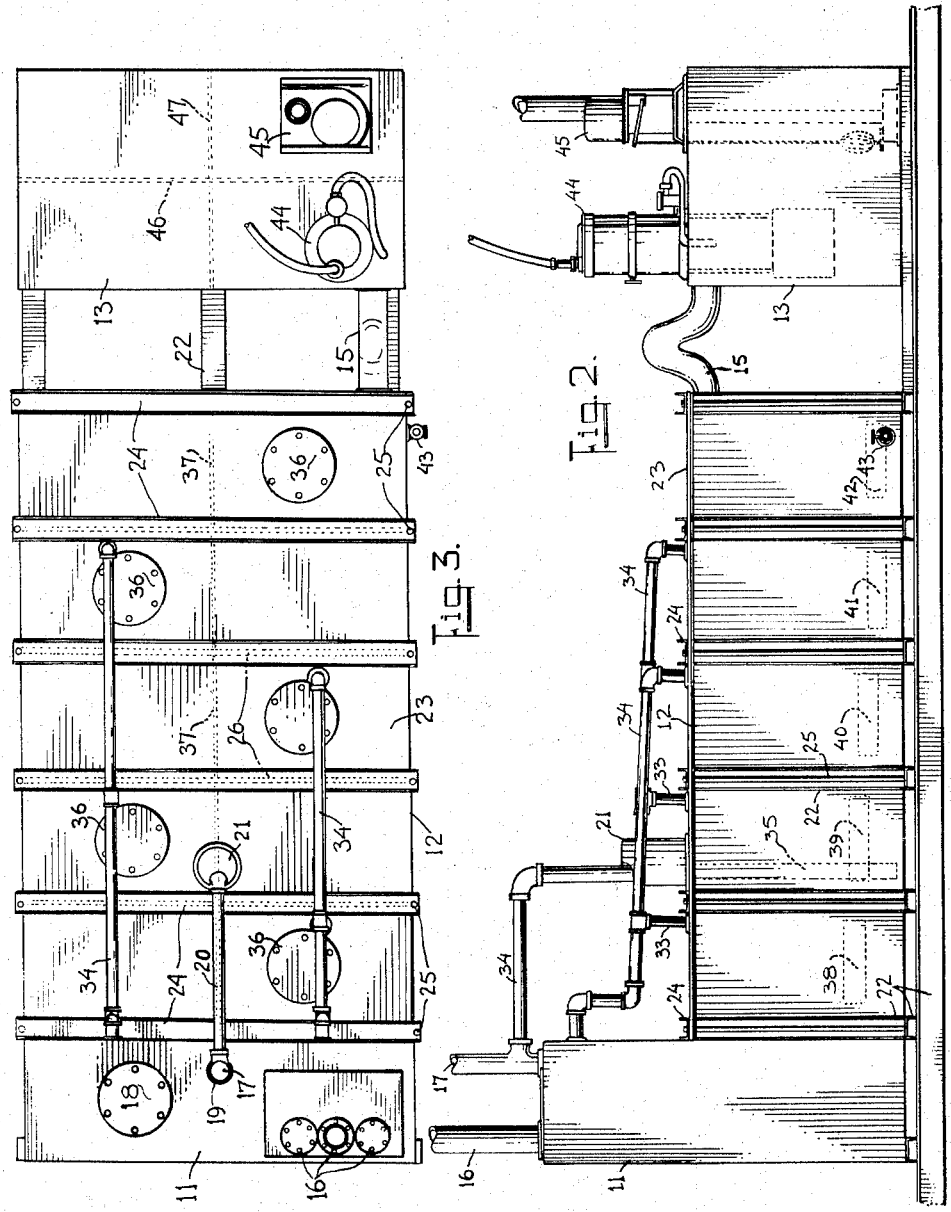
INVENTORS
DOUGLAS JOHN NELSON LIGHT
BERTRAND JOAQUIN BLAIR
By Ross G. Gray
ATTORNEY

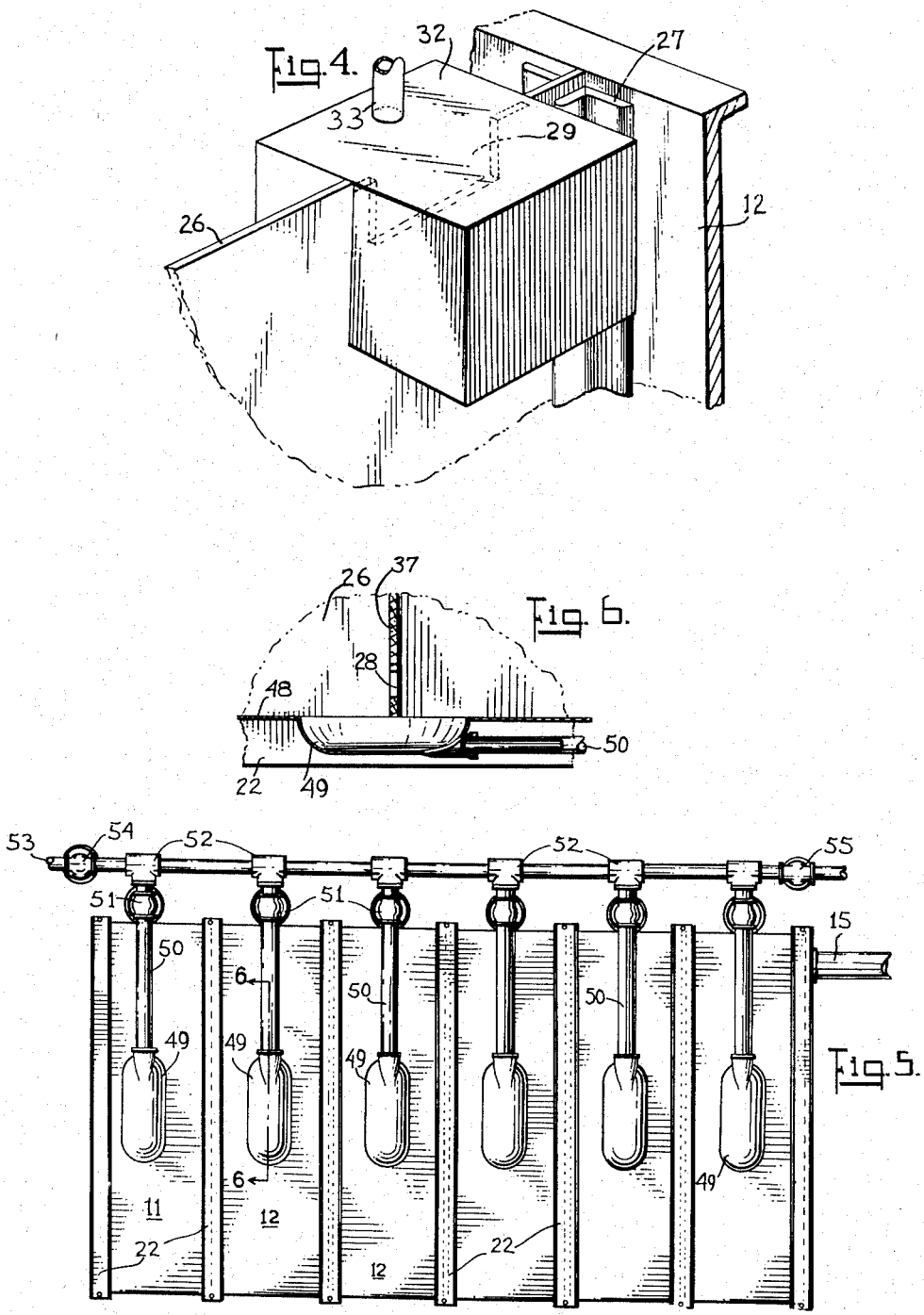

United States Patent Office 2,907,463
Patented Oct. 6, 1959

2,907,463

SEPTIC AND ANTISEPTIC SEWAGE DISPOSAL UNIT

Douglas John Nelson Light, Toronto, Ontario, and Bertrand Joaquin Blair, Woodstock, Ontario, Canada Application February 7, 1957, Serial No. 638,772

10 Claims. (Cl. 210—202)

This invention relates to the art of waste and sewage disposal and more particularly relates to a septic and antiseptic disposal unit effective to provide on a small scale for the primary and final treatment of sewage and other waste to yield an effluent of such a nature that it may be discharged without hazard of pollution into streams or larger bodies of water or otherwise directly disposed of.

In a preferred embodiment of the invention, the disposal unit is so constructed that it may find use aboard vessels where ultimate distribution of the effluent of a septic system through the surface of soil is not possible and the effluent must therefore be of a quality that will permit disposal in the sea or harbours, lakes and inland waterways, without causing either a nuisance or a health hazard.

The treatment of sewage by septic action, the biological process caused by the activity of certain anaerobes to reduce solid organic matter from higher to lower conditions of oxidation with increased solubility, has long been known and applied. At one time, in such treatment was thought to lie the easy solution to all problems of sewage disposal. However, in recent years municipalities and those faced with waste or sewage disposal on a large scale, as opposed to those with smaller scale requirements, have turned away from septic treatment, upon the development of other methods of treatment, such as the activated sludge process, which yielded on the large scale more satisfactory results. Nevertheless the so-called "septic tank" is still being authoritatively recommended for smaller installations and where municipal sewers are not available.

Certainly in part this falling into disuse of the septic treatment of sewage has been due to inherent disadvantages in the process. Septic decomposition takes place accompanied by the generation of considerable heat and the contents of the septic tank are frequently and unpredictably subject to septic boiling. Under these conditions quantities of undigested sludge are apt to be discharged into the effluent, the result being on occasion an effluent of poorer quality even than the influent. Elaborate attempts have been made to avoid the discharge of sludge with the effluent. Many modifications exist to the widely known "Imhoff" sewage treatment system developed at the beginning of the century, which sought to avoid interchange of material and the overflow of sludge into the effluent by employing a deep tank divided horizontally into an upper sewage settling chamber and a lower sludge digestion chamber. Others have employed a system of filter beds to try to remove any sludge carried over in the effluent. Filter beds, however, are easily clogged by large undigested particles, require constant supervision and maintenance, and have little application in outdoor operations in the rigorous winter climate of this country.

It is also necessary to guard against oversepticization where the putrefaction under anaerobic action causes a breakdown in the substances composing the sewage to yield an excess of urea and ammonia which cannot be fully oxidized in the subsequent operations of the system. Again the resulting effluent is fully as dangerous to human health as the raw waste material introduced into the system.

Moreover, with any septic treatment there is the problem of disposal of the effluent. It is common practice today to distribute the effluent from the septic tank through or over the surface of the soil. This may be done by lagooning the effluent into oxidation ponds where it purifies itself by natural processes aided by evaporation. Alternatively the effluent may be discharged into a body of water. The most widely recommended method of dispersal of the effluent is the sub-surface distribution through a system of drainage pipes to a leaching pit, or drainage well, where the soil conditions are suitable, or to an artificially constructed tile bed, in the case where the soil does not readily support percolation.

Each of these methods of disposal have their attendant and well known disadvantages. Lagooning requires a large surface area, provides ideal breeding grounds for mosquitoes and disease-carrying insects and is exceedingly difficult to control where overflow or flooding could be disastrous. Where the septic effluent is discharged directly to a body of water or to the soil, if the volume of diluting water or the area of land used for disposal is not sufficient, a health hazard will be created. As a practical matter land drainage is seldom ideal. It has been estimated that but a small percentage of the earth's surface possesses the natural soil conditions required for adequate percolation. It is therefore frequently necessary to import materials to construct a tile bed. The construction and maintenance of a proper tile bed distribution system is expensive and further, there are instances where a tile bed cannot be used. Where it is impossible to obtain treatment by soil absorption, effluent from the septic tank must be discharged directly to a stream or exposed to the air. Water pollution is a matter of vital concern today and it is our intention to provide a disposal unit which will furnish a treated effluent of a high order of clarity and purity, suitable to be discharged directly to a body of water without danger of pollution.

A particular problem arises with the disposal of waste and sewage from vessels. The present shipboard practice is to utilize a simple holding tank which is discharged when full, ideally in open water. However, it is not always possible to discharge the tank in open water, particularly in the case of vessels plying the inland waterway system of North America. In addition the ship may be berthed in harbour for a period exceeding that which its sewage collection tank will serve without discharge. In either case the discharge of raw sewage results in nuisance and damage to riparian owners, to beaches and waterfronts, and a contribution to pollution.

A further problem arising from the present shipboard facilities is sometimes though less frequently encountered. On inland waterways vessels follow one another in set paths or channels often at close intervals. To fill its tanks with water for use by the crew and in washing, a ship will draw in water usually from certain areas designated as "safe" by public authority. It is not unheard of for the sewage tank of a preceding ship to discharge shortly before a following ship unknowingly chooses to fill its tanks with the obvious result, inconvenient if discovered, dangerous if not.

The present invention therefore contemplates the construction of a sewage disposal unit for use in small scale operations which will provide an effluent of a nature which conforms to health standards and may be safely distributed.

It is another object of the present invention to provide a unitary septic and antiseptic disposal unit which need not be buried on installation, is portable and functions with a minimum of day to day, month to month attention on the part of the user.

It is a further and most important object of the present invention to provide a unit as described which in operation will yield an antiseptic effluent of high clarity without resort to mechanical means of solid separation, such as pressure filtration.

A further object is to provide such a septic and antiseptic disposal unit adapted to find use on vessels plying inland and open waterways, where sewage effluent must be discharged directly to a body of water, harbour, lake or river.

The above listed and still other features and purposes of the present invention may be understood from a carefull reading of the following description of the invention, in conjunction with the accompanying figures and drawing, which set forth preferred embodiments in illustration of the invention wherein Figure 1 is a perspective view of the unit of preferred form with certain portions cut away to illustrate the features of construction and operation;

Figure 2 is an elevation view of the said unit;

Figure 3 is a plan view of the unit;

Figure 4 is a perspective view of a part of the unit showing in larger scale the arrangement of baffles about an opening from one compartment of the unit to another;

Figure 5 is a plan view of the under side of a particular embodiment of the invention illustrating a unit with self-contained sludge discharge system;

Figure 6 is a partial vertical section taken along the line 6—6 of Figure 5.

Figure 1:
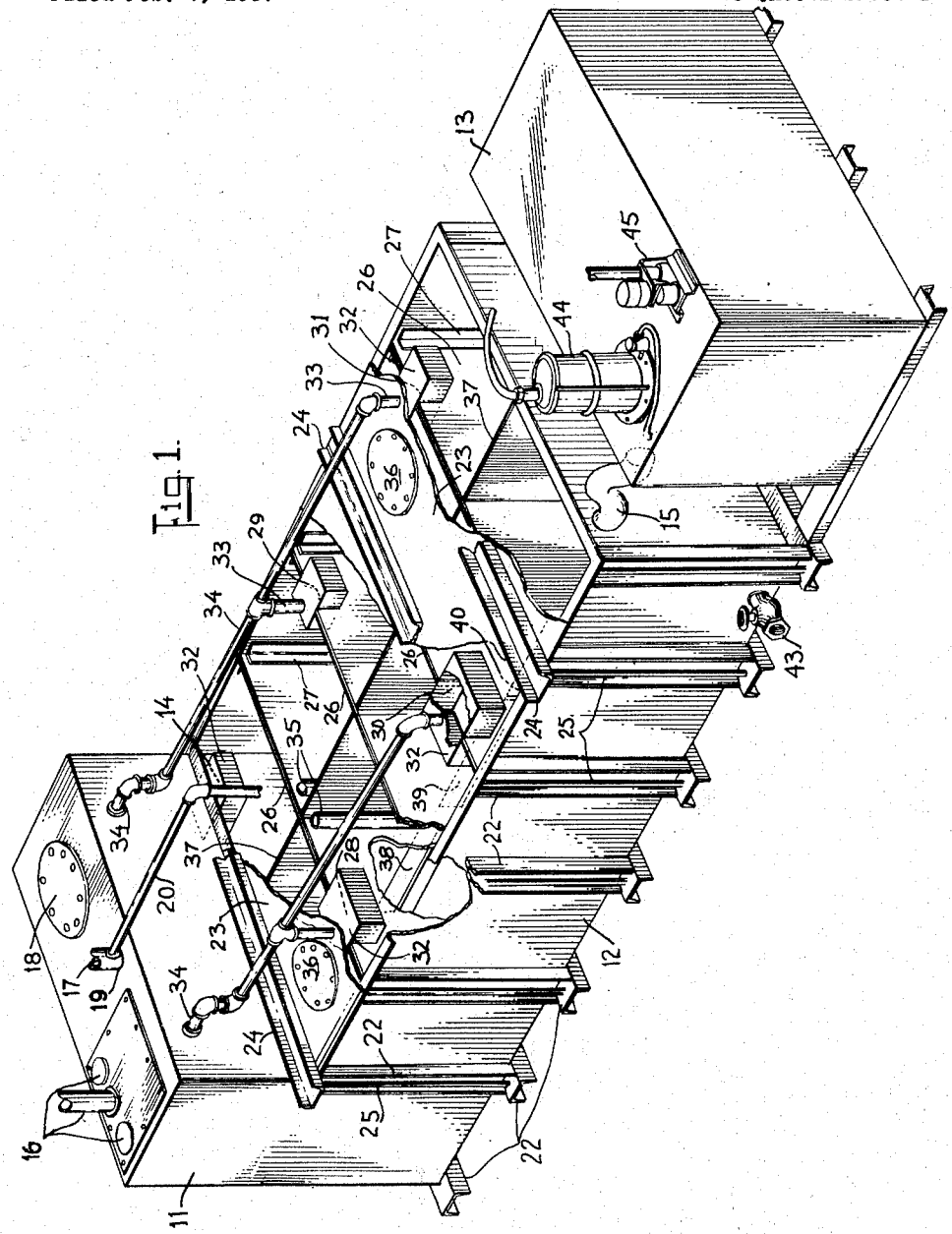

By reference to the drawings it will be seen that a disposal unit according to the invention comprises substantially three rectangular tanks, indicated generally by the reference characters 11, 12 and 13. These tanks are preferably formed of mild steel sheet, but may be advantageously realized in other materials, e.g. cast concrete, where the situation permits. Especially where steel is used, it is recommended that the sides of the three tanks be coated with a heavy asphalt material to resist corrosion and prolong the life of the tanks. The tanks 11 and 12 are joined directly to one another and interconnected by means of an opening 14 at one side of a lateral face of the tank. The tank 13 is connected to tank 12 by means of a goose-necked trap 15 which forces the fluid to rise above the top of tank 12 to flow into tank 13. This manner of connection maintains a head of pressure on tank 12 and ensures that that tank will be completely filled at all times.

The rectangularly shaped primary tank 11 is of a size to carry substantially more sewage than will be delivered to it at any one time by the system it serves. This primary tank serves as a digestion chamber for the raw sewage influent which may enter the tank from a variety of sources through collection pipes and a plurality of openings 16 in the top of the primary tank 1. In the initial digestion decomposition, quantities of gas are produced and provision for the leading off of such gas is made by the use of a vent pipe 17 set in an opening 19 in the top of the tank 11. The top of the tank 11 is also provided with a covered opening 18 to permit the periodic removal of accumulated sludge in the bottom of the tank by means of a pump. Led into the tank 11, either by means of a joint with the vent pipe 17 (as shown in Figure 1) or through a separate opening in the top of the tank (not illustrated), is a delivery pipe 20 from the reseeding pump 21, the purpose and operation of which will be more particularly described hereafter.

As will be observed in Figure 1 the tank 12 is an effluent collecting tank of generally greater overall length than tank 11. In the illustrated embodiment this tank is reinforced on the sides and bottom with channel or angle members 22. A single overall cover 23 is provided for the tank and this too is reinforced with channel or angle members 24, the latter being used with their counterparts fixed to the bottom of the tank and cover bolts 25, to fasten the cover securely to the tank in order to prevent the leakage of air into the tank which would tend to upset the anaerobic activity therein, or leakage of the contents out of the tank. In this regard the asphalt covering referred to above assists in making and maintaining a tight seal. Gasket material may also be used for this purpose.

The tank 12 is divided into a number of compartments by lateral partitions 26 held in place within the tank by angle strips 27. These partitions may be of steel but in the case of the shipboard application wood partitions have been used for lightness. The partitions may be coated with an asphalt material in the same manner as the inside of the tanks. Each partition is formed with an opening cut from its upper edge so that there may be a flow of effluent from one compartment to the next. These openings 28, 29, 30 and 31 in successive partitions are placed alternately on one side of the tank and the other. This is best illustrated in Figure 1 where it is seen that the opening 28 in the first lateral partition is made on the side of the partition remote from the opening 14 which leads the effluent from tank 11. In the same manner the opening 29 in the second partition is on the opposite side of the tank from the opening 28 and so on with the openings 30 and 31. Primarily to improve the sedimentation in the decanting operation carried on in tank 12, but also to the end of limiting violent movement of the contents of the tank, it has been found desirable to further subdivide the compartments of the tank by placing a vertical partition 37 longitudinally along the center line of the tank, interlocking with the lateral partitions 26 and bisecting the tank and each of its compartments. Openings 38, 39, 40, 41 and 42 are cut near the bottom edge of this longitudinal partition at intervals appropriate to provide when in place means of liquid transfer from one portion to the other of each bisected compartment. The said openings are located just above the estimated level of sludge in each compartment. This level differs from compartment to compartment as seen from the location of the openings in Figure 2. The flow of sludge-laden liquid through, for example, the first compartment of tank 12 will be through the entrance opening 14 from tank 11, downwards and through the center partition opening 38 and thence upwards and decanting through the lateral partition opening 28 to the next compartment. This down-up-down pattern of flow is repeated through each of the compartments materially aiding in the deposit of solid material in the bottom of each compartment and decreasing the possibility of a direct and rapid passage of the solid material across the top of the tank without proper sedimentation.

When the septic unit is in operation, the surface of the liquid in primary tank 11 and at least the early compartments of the tank 12 will be covered by a scum. It is desirable that this scum not be decanted with the effluent from chamber to chamber and accordingly we have provided baffles 32 situated over the openings 28, 29, 30 and 31 from compartment to compartment and the opening 14 from tank 11 to tank 12. The details of these baffles will be seen by reference to Figure 4 which as an example illustrates in perspective the passage of effluent through the opening 29. The baffles 32 are in the shape of an inverted box, closed on the sides and top but open at the bottom. The baffle is set over the partition 26 as shown in Figure 4, at the point where the opening in the partition 29 has been cut or formed. Thus the opening 29 is surrounded by the sides of the baffle which extend downwardly into the tank and covered by the top of the baffle. The flow of the effluent is from underneath one side of the baffle up and through the opening into the adjoining chamber and thence downward to emerge from under the opposite side of the baffle. From the top of each baffle and passing through the cover of the tank 12, is led a small diameter trapped air release pipe 33. The gases collected at the individual baffles through the trapped air release pipe 33 are conducted by means of conduction pipes 34 to the upper part of tank 11 from which they are vented through the previously mentioned vent pipe 17.

It has been found that the initial septic digestion process carried out in tank 11 may be accelerated if septicized effluent from a later stage of the process is added to the initial charge of raw sewage. Accordingly we have provided a reseeding pump 21 to draw through pipes 35 a portion of the contents, liquid and solid, of one of the compartments of tank 12. Any commercially available surge pump may be used as a reseeding pump. The reseeding material is transported by means of a feeder pipe 20 back to the tank 11 where it is mixed with the incoming sewage. The positioning of the reseeding pump is not critical, it being desirable only to have the pump placed in a compartment where a certain amount of sludge will be picked up and carried back to be reunited with the original charge. This reseeding operation is particularly valuable where the influent consists in part of kitchen waste which has a very high rate of bacteria-oxygen demand, ensuring sufficient anaerobic bacteria to encourage septic activity in tank 11. It should be noted that there is no need for the reseeding pump to be operated continuously but it may be tied in with periods of peak demand on the system, that is, varying with the input. By the use of reseeding, the period for complete digestion can be reduced and the size of the package unit for a given demand similarly reduced.

Again as in the case of tank 11, each compartment of tank 12 is provided with a covered opening 36 through which sludge may be removed from time to time by use of a suction pump.

In a shipboard installation, available space is frequently at a premium and it has been seen desirable that a method be devised to flush and clean the tanks in a manner which does not involve the removal of the secondary tank cover 23 or the covers of the openings 18 and 36. Accordingly we have developed a method of sludge removal which may be remotely operated. The apparatus to carry out this method is illustrated in Figures 5 and 6 as an additional embodiment of the invention.

In accordance with this refinement of the invention, there are mounted under openings made in the under side 48 of tank 11 and each compartment of tank 12, oval catch basins or bell traps 49. From the bottom of each of the traps 49, gathering pipes 50 lead through valves 51 and T-connections 52 to a line 53 connected with the main surface water system of the ship. By opening an input valve 54 and any of the gathering pipe valves 51 while closing the discharge line valve 55, it is possible to force fresh water from the ship's water system into tank 11 and any one or more of the compartments of tank 12. The sludge produced over a period by the operation of the disposal unit tends to settle as a solid cake in the bottom of the tanks. By forcing a stream of water into the bottom of the tanks the solid cake is broken up and the contents of the tank made turbid, to be drawn off by the use of a discharge pump (not shown in figures) when valve 54 is closed and discharge valve 55 opened. In this way the whole unit, or individual compartments can be flushed, drained and refilled by manipulation of valves and pumps at a station remote from the installation of the unit.

Where the tank is to find use on board vessels it is essential to avoid pitch and sway in the contents of tank 12. Such motion would have an unsettling effect on the contents of the tank, would impede sedimentation and encourage the overflow of solid material with the effluent. The effect of the roll of the vessel is minimized because tank 12 is completely full of fluid at all times due to the head maintained on it by the positioning of the gooseneck connection to tank 13. The effect of the roll of the ship may be further minimized by inserting more than one longitudinal partition in tank 12 to further break up the body of liquid in the tank. Instead of bisecting the compartments with a single partition, each compartment may, by a plurality of longitudinal partitions, be subdivided into subcompartments. In such a case, the openings from compartment to compartment may be alternatively located at the upper and lower edges of successive partitions so as to maintain flow of the contents of the unit through the secondary tank repeatedly downward and then upward in a tortuous path, with decanting over every other partition.

A drain valve 43 is provided near the bottom of tank 12 through which part of the contents of tank 12 may be drawn off to lower the level of the system for cleaning purposes.

As has been recited the contents of tank 12 are led to the antiseptic treatment tank 13 by use of a gooseneck trap 15. The trap will ensure that free oxygen will not reach the septic treatment tanks 11 and 12 even though the tank 13 is never filled to capacity.

When the unit is put into use, the tank 12 is filled to capacity with water. The provision of the goose-neck trap connecting the secondary tank 12 with the tank 13 at a level above the secondary tank will ensure that the liquid level in tank 11 will be above the top of tank 12 and that a head of pressure will be created on the contents of tank 12 which will maintain that tank full at all times. The surge of influent into tank 11 will create a resultant movement of the liquid contents through the secondary tank and into the tank 13.

Antiseptic contact chamber 13 is a simple rectangular tank, of size proportionate to the rest of the unit, into which the septic effluent from the previous operations is received. After the long series of sedimentations and decantings, the septic effluent will be comparatively free of solids, and as it enters the tank 13 it is subjected to the action of a predetermined amount of hypochlorite introduced into the chamber by a hypochlorite feeder situated adjacent the goose-neck inlet, and indicated generally by the character 44. Such feeders to treat septic influent are commercially available and one such that we have found to be particularly adaptable and accurate in controlled dosage is that manufactured by Tested Appliance Company of Chicago, Illinois, under the trade designation "Everchlor Automatic Chlorinator Model SS." This type of feeder has the further advantage of being capable of remotely dosing, setting and resetting. Another characterized by the desirable accurate inline feeding is that manufactured by Wilson Chemical Feeders Inc. of Buffalo, New York and designated "Model LX Chlorine Feeder."

The hypochlorite introduced into the septic effluent immediately upon its entry into tank 13 decomposes to yield hypochlorous acid, a powerful oxidizing agent which reacts on contact with the unstable organic matter of the septic effluent. The result is that the septic effluent is rendered antiseptic in a short time by oxidation. A particle of organic matter entering the contact chamber 13 should be exposed to a dosage of the oxidation agent sufficiently strong to completely oxidize the particle and thus avoid the possibility of occurrence after discharge from the unit of the well-known phenomenon of aftergrowth. To this end the amount of hypochlorite required will vary in proportion to the volume of raw sewage delivered to the unit and adjustment may be made. Where the demand is substantially constant the feeder can be accurately preset. The required dosage may be readily calculated by measuring the residual chlorine content of the ultimate effluent from tank 13, by an appropriate test, e.g. the ortho-tolidine colour reaction method.

The oxidized and sterile liquid may finally be discharged by automatically controlled means directly to a leaching pit or open waters without danger of pollution. In the figures an electric sewage pump 45 has been illustrated, but siphon or other transporting means may be used alternatively.

Again where the unit is to be used on a vessel it is desirable to partition the tank 13 as well, with perforated screen baffles as indicated in dotted outline and by the characters 46 and 47 in Figures 2 and 3.

While the direction of travel of the influent through the secondary tank has been described as being from side to side in one compartment across the full width of the tank before proceeding to the next compartment, it will be apparent that the flow could equally be directed along the length of the unit successively through all the subcompartments on one side of the unit, passing through the longitudinal partition in the farthest compartment from the inlet opening 14 and back through the subcompartments on the opposite side. Here again the openings in successive partitions can be cut to achieve direction of the influent repeatedly downward and upward in a tortuous path.

While the disposal unit has been illustrated and described particularly as it may be applied to a vessel it will be understood that it is equally applicable to situations on land where a compact mobile unit is desired which will effect complete digestion of sewage and sterilization of the effluent so that the final clear effluent may be disposed of directly to the soil or open water without hazard to human health.

The design of the septic and antiseptic disposal unit permits installation either above the ground or basement installation. Under these conditions the unit is readily accessible for adjustment, reconditioning and cleaning. The package unit is portable, an advantage where it is necessary to move from one side to another, e.g. construction or work camps.

It is to be understood that the invention is not limited to the precise form shown, but that it includes within its purview whatever changes fairly come within the scope of the appended claims.

We claim:

1. A septic and antiseptic sewage disposal unit comprising a primary anaerobic digestion tank, a secondary anaerobic digestion and decantation tank of relatively lesser height than the primary tank, the said secondary tank compartmented by a plurality of lateral partitions, a portion of the upper edge of each lateral partition being cut away to provide an opening for the passage of the contents of the tank, a longitudinal partition bisecting each of the said compartments of the secondary tank and having openings near its lower edge spaced so as to provide at least one opening in the partition for each compartment, a third oxidation tank connected to the secondary tank, the connection being made at a level above the said secondary tank to maintain a head of pressure in the contents of the secondary tank when filled and oxidation agent feeding means in association with the said third tank, the said tanks and the compartments of the secondary tank being interconnected such that the flow from tank to tank and compartment to compartment is by decantation.

2. The unit of claim 1 wherein each of the openings from primary tank to secondary tank, and compartment to compartment of the secondary tank, is surrounded by a baffle extending downwardly into the tank.

3. The unit of claim 1 wherein the secondary tank is vented over each of the openings from compartment to compartment to provide for the release of gases collected at the said openings.

4. The unit of claim 1 wherein are provided catch basins mounted under openings made in the under side of the primary tank and each compartment of the secondary tank, the said catch basins being connected to a source of fluid, a means for forcing the fluid into the unit and a discharge system.

5. The unit of claim 1 wherein there is provided reseeding means adapted to withdraw from a compartment of the said secondary anaerobic digestion and decantation tank and deliver to the primary anaerobic digestion tank, a portion of the contents of the said secondary tank.

6. A septic and antiseptic sewage disposal unit comprising a primary anaerobic digestion tank, a secondary anaerobic digestion and decantation tank of relatively lesser height and greater length than the primary tank, the said secondary tank compartmented by a plurality of lateral partitions, a portion of the upper edge of each lateral partition being cut away to provide an opening for the passage of the contents of the tank, baffles surrounding the said openings and extending downwardly into the tank, the said baffled openings being vented to provide for the escape of collected gases, a longitudinal partition bisecting each of the said compartments of the secondary tank and provided with at least one opening at its lower edge for each compartment, reseeding means to withdraw from a compartment of the said secondary tank and deliver to the primary anaerobic digestion tank a portion of the contents of the secondary tank, a third oxidation tank connected to the secondary tank at a level above the said secondary tank to maintain a head of pressure in the said secondary tank and hypochlorite feeding means in association with the said third tank, the said tanks and the compartments of the secondary tank being interconnected such that the flow from tank to tank and compartment to compartment is by decantation.

7. A septic and antiseptic sewage disposal unit comprising a primary anaerobic digestion tank, a multicompartmented secondary anaerobic digestion and decantation tank of lesser height than the said primary tank, a third oxidation tank connected to the secondary tank, the connection being made at a level above the secondary tank so as to maintain a head of pressure on the contents of the secondary tank when filled, and oxidation agent feeding means in association with the said third tank, the said tanks and compartments of the secondary tank being interconnected such that the flow from tank to tank is by decantation and the flow through the compartments of the secondary tank is directed in a tortuous path repeatedly downwardly and then upwardly to decant to the next portion of the said tank.

8. A septic and antiseptic sewage disposal unit comprising a primary anaerobic digestion tank, a secondary anaerobic digestion and decantation tank of relatively lesser height than the primary tank, the said secondary tank compartmented by a plurality of lateral partitions and having at least one longitudinal partition subdividing each of the said compartments into subcompartments, a third tank connected to the secondary tank, the connection being made at a level above the secondary tank so as to maintain a head of pressure on the contents of the secondary tank when filled, and oxidation agent feeding means in association with the said third tank, the said tanks being interconnected such that the flow from tank to tank is by decantation and openings being provided in the longitudinal and lateral partitions of the secondary tank so that the flow through the subcompartments of the secondary tank is directed in a tortuous path repeatedly downwardly and then upwardly to decant to the next subcompartment of the said tank.

9. The unit of claim 8 wherein each subcompartment of the secondary tank is vented to provide for the release of collected gases.

10. A septic and antiseptic disposal unit comprising a primary anaerobic digestion tank, a secondary anaerobic digestion tank of relatively lesser height than the primary tank, the said secondary tank compartmented by a plurality of lateral partitions and having at least one longitudinal partition subdividing each of the said compartments into subcompartments, openings being provided in the said lateral and longitudinal partitions so placed that the flow through the subcompartments of the secondary tank is directed in a tortuous path repeatedly downwardly and upwardly to decant to the next subcompartment, each of the said compartments being vented to provide for the release of collected gases, reseeding means to withdraw from a compartment of the said secondary tank and deliver to the primary anaerobic digestion tank a portion of the contents of the secondary tank, a third oxidation tank connected to the secondary tank, said connection being made at a level above the said secondary tank so as to maintain a head of pressure on the contents of the secondary tank when filled, and oxidation agent feeding means in association with the said third tank, the said tanks being interconnected such that the flow from tank to tank is by decantation.

References Cited in the file of this patent

UNITED STATES PATENTS

| | | |
|---|---|---|
| 495,834 | Powers | Apr. 18, 1893 |
| 568,620 | Linstrom | Sept. 29, 1896 |
| 691,365 | Dittler | Jan. 21, 1902 |
| 845,520 | Callow | Feb. 26, 1907 |
| 869,001 | Lucas | Oct. 22, 1907 |
| 1,177,849 | Kalb | Apr. 4, 1916 |
| 1,715,438 | Travers | June 4, 1929 |
| 2,246,224 | Streander | June 17, 1941 |
| 2,572,767 | Schlenz | Oct. 23, 1951 |